INVENTOR.
JOEL GRAYSON JONES,
BY
Barkelew + Lewis

INVENTOR.
JOEL GRAYSON JONES.
BY
[illegible]

United States Patent Office 3,428,856

Patented Feb. 18, 1969

3,428,856

TELEVISION HIGH VOLTAGE REGULATOR

Joel Grayson Jones, Glendora, Calif., assignor to Conrac Corporation, Duarte, Calif., a corporation of New York Filed May 24, 1965, Ser. No. 458,304
U.S. Cl. 315—27 11 Claims
Int. Cl. H01j 29/70

ABSTRACT OF THE DISCLOSURE

The ultor voltage supply for a television cathode ray tube is stabilized against increased load caused by abnormally high electron beam intensity by producing a corresponding increase in the energy stored electromagnetically during horizontal trace time and/or by discharging the stored energy into the high voltage system more rapidly and hence at a higher voltage. In one embodiment a saturable reactor is connected effectively in parallel with the horizontal deflection yoke, and its control winding is supplied with a current that varies directly with the long term variations in the electron beam current, preferably in a suitably nonlinear manner. Alternatively, a conventional choke coil may be employed, connected in series with an impedance that is varied inversely with the electron beam intensity. Useful stabilization is obtainable merely by designing the high voltage transformer so that its core becomes progressively saturated with increasing ultor load by the direct current component of the primary current.

This invention has to do with television systems in which the line deflection of a cathode ray beam is produced electromagnetically and the high voltage for accelerating the electron beam is developed from the flyback voltage pulse produced by the line deflection circuitry.

The invention is concerned more particularly with improved means for regulating the high voltage produced by such systems.

Development of the ultor high voltage from the flyback pulse is advantageous in many respects, but leads to relatively poor inherent voltage regulation. That is, considered as a high voltage power supply, such a system has a high internal resistance, typically several megohms, so that the voltage supplied by the system is relatively sensitive to variations in the load. The load upon the high voltage power supply varies with the intensity of the cathode ray beam. Thus, when a scene changes from near black to near white, or when the viewer of a television receiver advances the "brightness" control, the increased load on the high voltage system tends to lower the ultor voltage. The resulting variations in electron beam velocity cause annoying changes in picture size and other ill effects.

One known method of stabilizing the high voltage supply in conventional television receivers is to shunt the high voltage essentially to ground through a vacuum tube and to control the tube grid potential in such a way that the plate current varies inversely with the value of the high voltage. The total load on the high voltage supply is thereby held relatively constant, but at the cost of increased average current drain. Shunt regulation of this type is not adaptable to systems utilizing only solid state components, since the value of the high voltage, typically ten to twenty kilovolts, is beyond the range of present day transistors.

The present invention is capable of providing high voltage regulation without significant increase in the average high voltage power requirements.

The invention further provides regulation of the high voltage supply in systems of the type described in a manner that is well adapted to the exclusive use of solids state components.

The invention can be carried out through a wide variety of circuit structures. On the one hand, excellent high voltage regulation and other operating characteristics are obtainable at only moderate expense. On the other hand, a useful degree of regulation may be obtained with little or no addition to conventional production costs.

These and other objects of the invention are accomplished, in accordance with one aspect of the invention, by automatically varying the amount of energy that is stored magnetically during trace time of the cathode ray beam and that is made available for high voltage generation during retrace time. Control of such variation in the amount of energy stored is typically effected in response to variations in the current drawn from the high voltage system. The energy available to the high voltage system is thereby increased in direct relation to the load, tending to stabilize the value of the high voltage supply.

In accordance with a further aspect of the invention, the retrace time is varied under control of the high voltage load in such a way that the retrace time is reduced in response to increasing load. That is accomplished by varying the effective resonant frequency of the system so that the frequency increases with increasing high voltage load. By thus increasing the resonant frequency of the system, the energy that is stored during trace time is discharged into the high voltage system more rapidly and hence at a higher voltage. That effect tends to stabilize the value of the high voltage supply, quite aside from any variations in the amount of energy that is stored.

Both of the aspects of the invention just described can be carried out by providing in the line deflection and high voltage system one or more inductive reactance elements that are variably saturable in response to variations of the power drawn from the high voltage system.

One form of the invention utilizes a saturable reactor of conventional type with its active winding connected effectively in parallel with the primary winding of the high voltage transformer. The control winding of the reactor is supplied with a control current that increases with the high voltage load. The amount of energy stored magnetically in the reactance then increases with the load current. At least part of the additional stored energy is discharged into the transformer during retrace time, producing a higher induced voltage in the transformer secondary and thereby stabilizing the high voltage output.

The described saturable reactor may be viewed alternatively as a means for varying the system resonant frequency under control of the high voltage load current. With increasing load current the inductance of the reactor is reduced without significantly increasing the distributed capacitance of the system. The natural frequency is thereby raised, tending to increase the voltage induced in the high voltage transformer secondary during retrace.

Control action may be obtained, if preferred, primarily by variation of the magnetic energy stored during trace time without significantly changing the resonant frequency of the system. For example, the saturable reactor just described may be replaced by a choke coil connected in series with a control element such as a transistor. By suitable control of the transistor the energy stored in the choke coil during trace time may be caused to vary in direct relation to the intensity of the picture tube beam. In such a system variation of the resonant frequency during retrace may be substantially eliminated by shunting the transistor by a diode in reverse polarity.

In another form of the invention a variable inductance element such as a saturable reactor is connected effectively in series with the flyback transformer rather than in parallel as described above. The reactor control winding is supplied with a control current that increases with the high voltage load current, as before. The reduced inductance of the saturable reactor with increased load current then increases the resonant frequency of the system and also leads to increased energy storage in both the saturable reactor and the transformer, which energy is available for high voltage generation during retrace. This arrangement has the relative disadvantage of dividing the flyback pulse voltage between the flyback transformer primary and the saturable reactor, requiring a higher transformer ratio or other compensating means to produce the same high voltage output.

When optimum regulation is desired in a system utilizing a saturable reactor it is preferred to supply to the control winding of the saturable reactor a control current that depends upon the high voltage load current in a non-linear manner designed to compensate the known non-linear characteristic of the saturable reactor. Such a non-linear control current may be developed, for example, by means of an amplifier that is biased by known techniques to produce the desired non-linear characteristic.

In a further form of the invention, the high voltage transformer is so designed that its core becomes progressively saturated by the increasing direct current component of the primary current that accompanies increasing current drain from the high voltage system. The transformer inductance is thereby reduced, increasing the energy that is stored in the transformer during trace time and transferred to the secondary circuit during retrace. Also, the decrease in transformer inductance due to core saturation raises the natural frequency of oscillation during retrace, tending to increase the value of the high voltage developed. An advantage of this form of the invention is that no additional components are required beyond those of a conventional system. The high voltage regulation is attained entirely through transformer design. Moreover, the required change in the transformer to obtain partial saturation is typically in the direction of reducing the cross section of the core or employing more economical core materials, and may actually reduce the cost of manufacture.

A full understanding of the invention and of its further objects and advantages will be had from the following description of certain illustrative manners in which it may be carried out. The particulars of that description and of the drawings which form a part of it are intended only as illustration and not as a limitation upon the scope of the invention, which is defined in the appended claims.

Figures 1, 2, 5, 6:
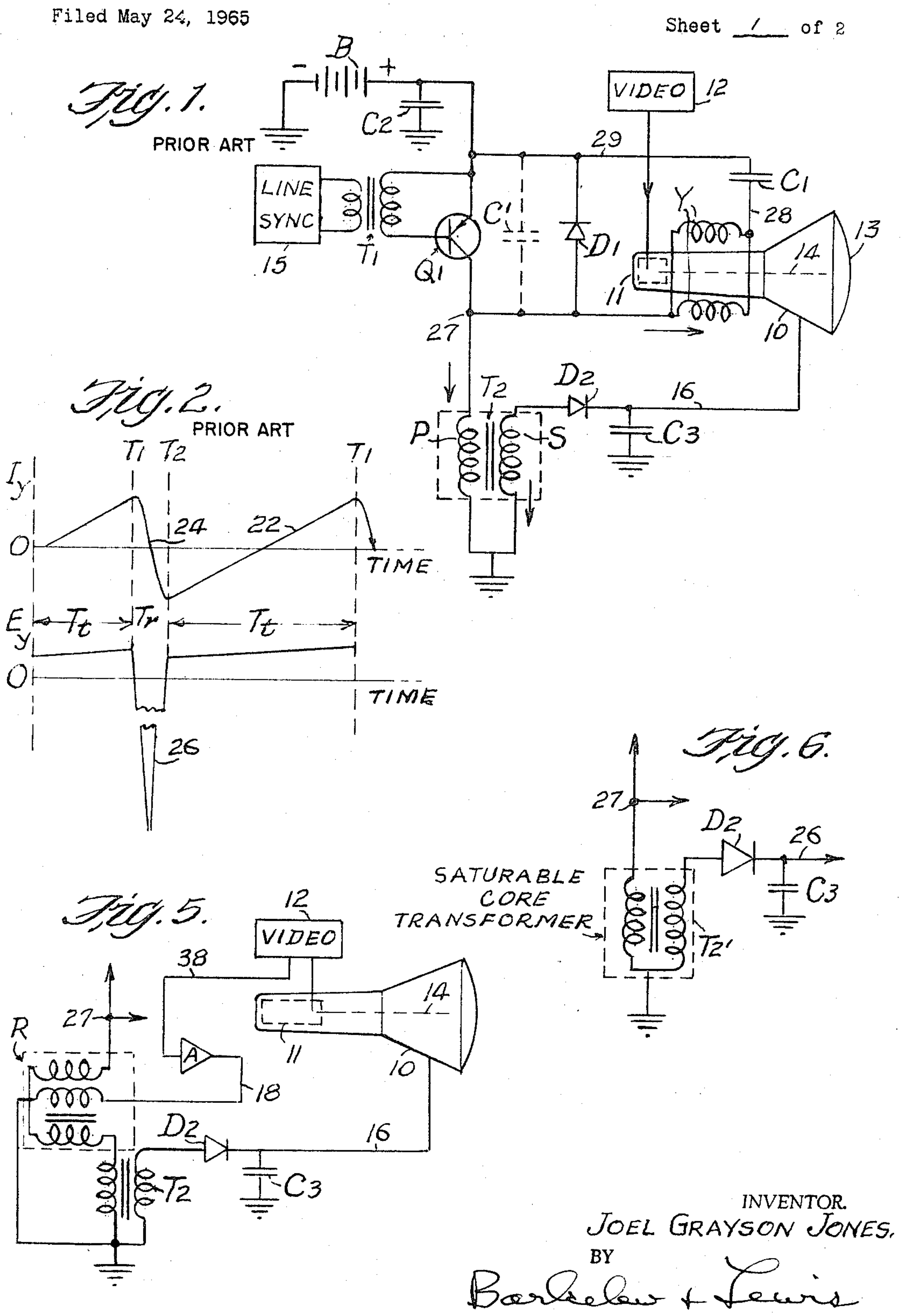
FIG. 1 is a schematic drawing representing a conventional line deflection and high voltage system.
FIG. 2 is a schematic graph illustrating typical operation of the system of FIG. 1.
FIG. 5 is a fragmentary schematic drawing representing a modification.
FIG. 6 is a fragmentary schematic drawing representing another embodiment of the invention.

FIG. 1 may be considered to represent in somewhat schematic form a conventional illustrative television deflection and high voltage system employing solid state components. A television picture tube is indicated at 10, with means indicated schematically at 11 for developing an electrode beam 14 of variable intensity in accordance with a video signal supplied in known manner by means indicated at 12. The beam is caused to scan the tube screen 13 in definite synchronization with the video signal to produce a picture. The line deflection yoke is indicated at Y, comprising two coils connected in parallel. The frame deflection yoke and its control circuitry are omitted for clarity of illustration. A signal synchronized with the desired television line scansion movement of the electron beam is developed in known manner at 15 and is supplied to the primary of the coupling transformer T1. That signal is of such wave form as to turn on the transistor Q1 during at least a portion of the active trace time $T_t$ (FIG. 2) and to turn off that transistor during retrace time $T_r$.

Transistor Q1 and the diode D1 behave as switches which apply a voltage E derived from the battery B across the parallel coils of the television line deflection yoke Y and also apply a similar voltage across the primary winding P of the flyback or high voltage transformer T2 during trace time; and which open the circuit during retrace time. During trace time, an essentially linear sawtooth current $I_y$ builds up in the television yoke, flowing to ground via the low impedance path for alternating current provided by C1 and C2. That sawtooth yoke current, indicated at 22 in FIG. 2, causes progressive horizontal deflection of the electron beam and thus produces the line trace movement. A similar current flows to ground through the flyback transformer primary winding. Since the transformer primary and secondary are typically quite loosely coupled, the latter current may be appreciable despite the fact that diode D2 blocks current flow in the secondary circuit during trace time.

For convenience of reference the polarity of the various voltages and currents during line trace, indicated by solid arrows in FIG. 1, will be called positive, and their opposites negative.

When conduction is cut off in Q1 at time $T_1$ at the start of retrace, the positive magnetic fields and currents built up in the television yoke and in the flyback transformer rapidly collapse and are built up in the opposite directions by oscillation of the system at the resonant frequency determined by the inductances and the stray capacitances of the circuit. Those capacitances are indicated schematically at C′, and may be supplemented by adding a capacitor in that position. The rapid reversal of current in the yoke, indicated at 24 in FIG. 2, causes line retrace of the electron beam. That current reversal is accompanied by a strong negative voltage pulse at junction 27, as indicated at 26 in FIG. 2, commonly referred to as the flyback pulse. That pulse is impressed upon the primary of flyback transformer T2. The resulting large voltage pulse in the secondary of T2 is rectified by the diode D2, filtered by the capacitance C3 and supplied as high voltage power via the line 16 to the ultor electrode of the picture tube.

During the described current reversal 24 from peak positive value to peak negative value, constituting one half cycle of circuit oscillation, flyback voltage pulse 26 is impressed on diode D1 in the backward direction. As the first half cycle of oscillation is completed at time $T_2$, the voltage at junction 27 becomes more positive than the battery voltage to which the line 29 is returned. Conduction in the diode then damps the oscillation, permitting the negative yoke current to circulate, charging C1 with junction 28 negative. That yoke current decays from its negative peak value at a rate corresponding to trace movement of the cathode ray beam, thus initiating the next cycle of line trace 22. As the negative yoke current approaches zero, Q1 is again turned on, discharging C1 by positive yoke current to complete the trace as already described. The line trace is made satisfactorily linear as a function of time, as by suitable biasing networks containing nonlinear components. Such techniques are well known and do not require description or illustration for an understanding of the present invention.

The magnitude of the voltage pulse developed in the secondary of high voltage transformer T2 depends, among other things, upon the amount of energy stored in the system in the form of magnetic flux during trace time, and upon the length of the retrace time between T1 and T2 during which the existing magnetic fields collapse and reverse. On the other hand, the current drawn through diode D2 to line 16 at the peak of each flyback pulse increases with the current drawn by the electron beam of the picture tube. The internal impedance of the flyback transformer and also that of rectifying diode D2 cause a voltage drop that increases with the high voltage load, tending to reduce the output voltage available to the picture tube whenever the picture brightness increases.

Figure 3:
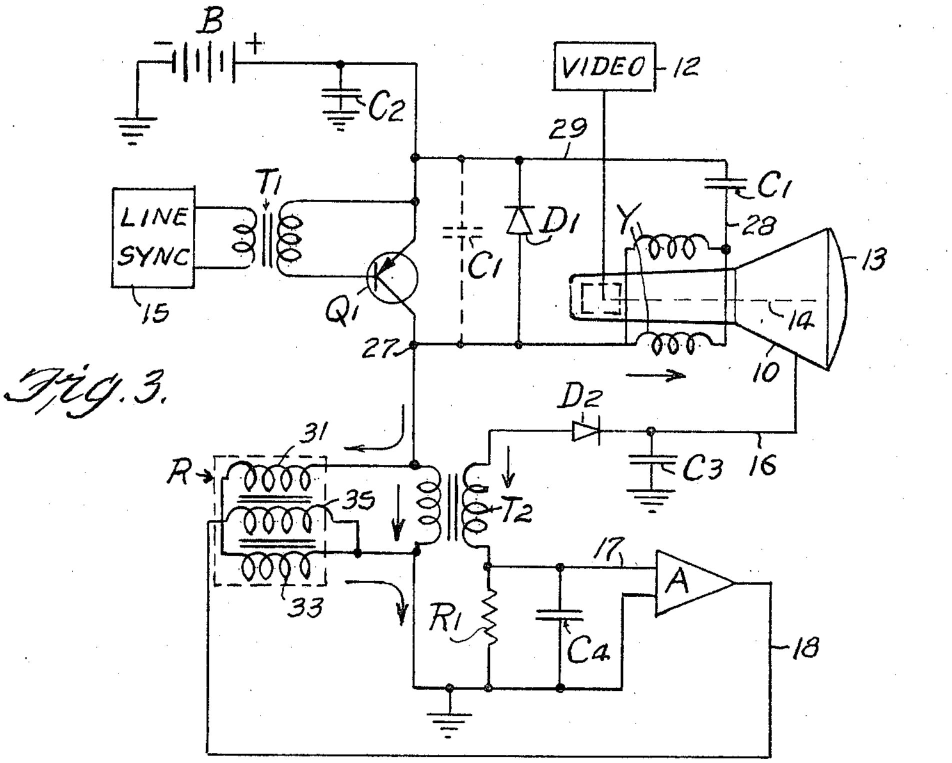
FIG. 3 is a schematic drawing representing an illustrative embodiment of the invention in a system of the type shown in FIG. 1.

FIG. 3 represents a preferred embodiment of the present invention in a system closely similar to that of FIG. 1. Components of FIG. 3 that correspond generally to those of FIG. 1 are denoted by the same numerals and their operation is generally similar to that already described.

The system of FIG. 3 includes sensing means responsive to variations in the high voltage load current, that is, to the direct current drawn from line 16 by the television picture tube. In the present embodiment that sensing of the electron beam current is accomplished by the resistance R1, which is inserted in the line between ground and the secondary of flyback transformer T2. The voltage drop in R1 is smoothed by the capacitance C4 and is supplied on the line 17 as input signal to the amplifier A. The amplifier delivers on the line 18 a direct current that corresponds in some definite manner to the voltage of the input signal.

The system of FIG. 3 also includes a saturable reactor, indicated schematically at R and comprising an active winding and a control winding wound upon a suitable common core structure. Reactor R is illustrative of a very wide variety of known saturable reactor structures which have the essential feature that the effective inductance of the active winding, measured at one pair of terminals, can be varied by the application of a bias or control current at another pair of terminals. In the present reactor the active winding comprises two series-connected coil sections 31 and 33 arranged in such a way that corresponding current variations in them induce voltages of opposite polarity in the control winding 35. The active winding 31, 33 is connected in parallel with the flyback transformer and is thus also effectively in parallel with yoke Y and in series with control transistor Q1. The reactor thus functions to store energy magnetically during line trace, supplementing the energy storing action of the transformer and of deflection yoke Y.

Control winding 35 of reactor R is connected between ground and the output line 18 from amplifier A. When the bias current supplied by the amplifier is great enough to partially saturate the core of the reactor, the effective inductance of the active winding is correspondingly reduced. The peak current I at the end of the trace time is approximately inversely proportional to the effective inductance L. Since the energy stored magnetically is essentially $0.5I^2L$, the stored energy is approximately inversely proportional to the inductance. The amount of energy stored in the reactor during trace time therefore varies directly with variations in the bias current in control winding 35. Accurate analysis of the effective reactor inductance requires consideration for the waveform of the active current and for the non-linear dependence of the incremental inductance upon the control current. The latter varies with the properties of the core material and the detailed core and winding configurations and can be calculated in known manner from such data or determined experimentally for a particular reactor.

In operation of the system of FIG. 3, under conditions of zero load in the high voltage power supply (picture tube dark there is no current through R1, no output (or minimum output) from amplifier A and no bias current (or minimum bias current) in control winding 35 of reactor R. Under that condition the effective inductance L of the active winding of the reactor is a maximum and the energy stored in the reactor during each trace period is a minimum.

Now, if a load is applied to the high voltage system, as when the picture brightness increases, the load current flows through $R^1$ and develops a corresponding voltage signal which is amplified by A. The resulting current through control winding 35 partially saturates the core of the reactor, decreasing the effective inductance of active coils 31 and 33. The current built up in those coils during each trace period is thereby increased, with corresponding increase in the energy stored magnetically during trace time. During retrace time that energy is discharged into flyback transformer T2, tending to produce a higher induced voltage in the transformer secondary.

At the same time, the reduced value of effective reactor inductance L produces an increase in the resonant frequency for oscillation of the system in response to cut-off of driving transistor Q1. The energy stored magnetically during trace time is therefore discharged more rapidly during retrace, shortening the retrace time and increasing the peak value of the accompanying flyback voltage pulse 26 of FIG. 2. Calculation indicates that such variation of the resonant frequency of the circuit contributes significantly to the overall control action.

When the control current supplied to reactor R is properly proportioned to the variations in the high voltage load current, as by suitable shaping of the transfer function of amplifier A, the overall control action can be made to compensate accurately for the voltage drop in the internal impedance of T2 and D2. The output high voltage is thereby maintained nearly constant as the load is varied. For optimum regulation it is usually desirable to design amplifier A with a non-linear characteristic to compensate for the non-linear characteristic of the saturable reactor.

Figure 4:
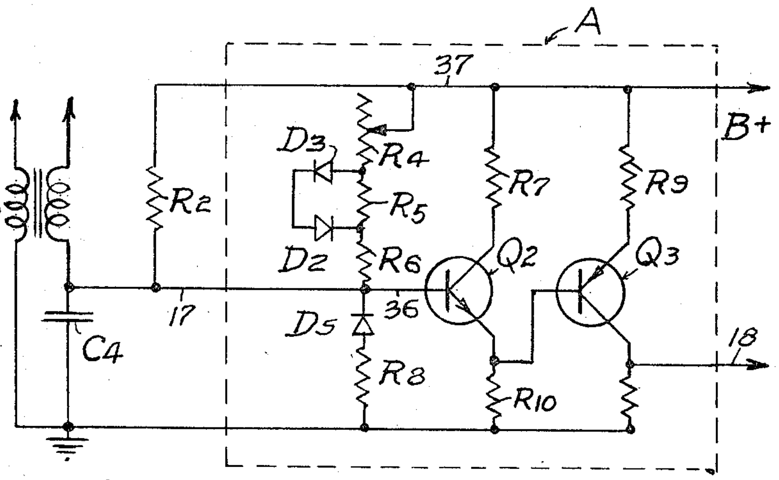
FIG. 4 is a schematic drawing representing an illustrative amplifier for use in the system of FIG. 3.

FIG. 4 represents illustrative circuit structure for amplifier A of FIG. 3, with input signal on line 17 and output on line 18. Transformer T2 and capacitance C4 of FIG. 4 correspond to the similarly designated elements of FIG. 3. Resistance R2 of FIG. 4 corresponds generally to R1 of FIG. 3, but is returned to B+ rather than directly to ground. Also, the signal developed on line 17 is modified by action of a biasing network that includes two branches. One branch comprises the resistances R4, R5 and R6 and the diodes D3 and D2 and is connected between line 17 and B+, and the other branch comprises the resistance R8 and diode D5 and is connected between line 17 and ground, R8 being large compared to R2. Those biasing components may be considered alternatively as sharing with R2 the function of developing a non-linear signal representative of the ultor current; or as forming a part of the amplifier and modifying the amplifier response to the linear signal developed by R2 alone. In either case, the signal applied to the base of the NPN transistor Q2 varies in a predetermined non-linear manner with the ultor current.

Transistor Q2 is used as an emitter follower, the value of R7 being small compared to R10. With zero ultor current, the base of Q2 is at substantially the potential of B+, typically 24 volts, making the transistor highly conductive. With Q2 conductive the base of the PNP transistor Q3 is strongly positive, cutting off output current on line 18. With increasing ultor current drawn by the picture tube, the current through Q2 is progressively reduced, lowering the base potential of Q3 and correspondingly increasing the output current delivered on line 18 to the control winding of saturable reactor R of FIG. 3. That output current depends upon the ultor current in a non-linear manner, determined primarily by the action of the described biasing network. The nature of that non-linearity is designed to compensate for the non-linear characteristic of the saturable reactor R of FIG. 3 and to produce the desired overall regulating action, leading typically to essentially uniform voltage supply to the ultor.

The control signal for amplifier A may be obtained in any desired manner that provides a suitable correspondence to the variations in the output load of the high voltage system. Resistor R1 in FIG. 3 may be said to sense those load variations directly. The load current variations can be sensed alternatively in terms of voltage variations in the high voltage supply, as at a junction of a voltage dividing string of resistors connected between line 16 and ground, for example.

FIG. 5 represents in fragmentary form a system similar generally to that of FIG. 3, and operating in generally similar manner. However, FIG. 5 illustrates the variety of possible circuit connections for reactor R, showing the reactor connected in series with transformer T2 rather than in parallel as in FIG. 3. FIG. 5 further illustrates derivation of the control signal for amplifier A from the video circuitry 12 which controls the intensity of electron beam 14. The output from amplifier A is supplied as before via the line 18 to the control winding of reactor R, and comprises a current that increases with the electron beam intensity in the manner already described. The resulting variations in the effective inductance of reactor R produce changes similar to those already described in the energy stored magnetically during trace time and in the resonant frequency of the system during retrace time.

In accordance with another aspect of the invention, the inductive reactance of the system may be caused to vary in response to the ultor load by designing and constructing the flyback transformer in such a way that the transformer core is variably saturable by the direct current component of the primary current, the degree of saturation increasing as that current approaches its maximum value in response to maximum electron beam intensity. Such design may be carried out in accordance with known principles of electromagnetic theory, typically by selection of the core material and the minimum cross section of the core structure in such relation to the number of turns in the primary winding that partial saturation of the core occurs in response to the desired value of the primary current.

FIG. 6 illustrates that aspect of the invention, representing a system similar to that of FIG. 1 except that the high voltage transformer T2′ is denoted as being constructed in such a way that the core is saturable.

Operation of a system utilizing a saturable transformer as in FIG. 6 is closely similar to that previously described for a system utilizing an auxiliary saturable component as in FIG. 3. The direct current component of the primary current in transformer T2′ of FIG. 6 increases with the high voltage load current drawn from the transformer secondary, and is used directly as a control current for varying the effective inductance of the transformer. That primary current component thus corresponds functionally both to the signal developed across R1 in FIG. 3 and to the output currentf rom amplifier A of that figure. The magnetizing current in the transformer of FIG. 6 during the portion of trace time when Q1 is conducting may be considered analogous to the current in the active winding of saturable reactor R of FIG. 3. As the effective inductance of the transformer is reduced by increasing "control current," the primary current built up during trace time, and hence also the energy stored magnetically, are increased. Increased energy is thereby made available for transfer to the secondary circuit during retrace time; and the resonant frequency of the system is increased, tending to increase the voltage produced in the secondary by the flyback pulse. Both of those effects tend to stabilize the high voltage supplied to the picture tube.

Figure 7:
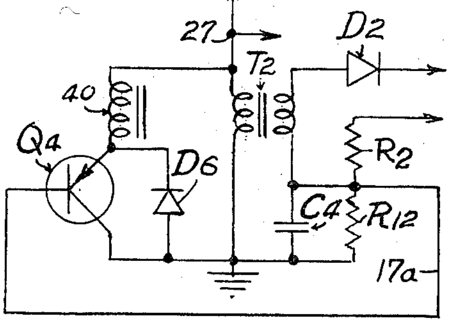
FIG. 7 is a fragmentary schematic drawing representing a further modification.

FIG. 7 represents a further embodiment of the invention, in which the energy stored magnetically during trace time is varied by means of an inductive winding 40 connected in series with a control element shown as the PNP transistor Q4. A control signal for Q4 is developed across R2, which acts essentially as described in connection with FIG. 4. The resistance R12 may be considered to represent a biasing network of any desired type, corresponding generally to R8 of FIG. 4. Non-linear elements and an isolating circuit such as transistor Q2 of FIG. 4 may be provided if desired, although the present system does not ordinarily require nonlinear shaping. The signal supplied via the line **17*a* to the base of Q4 is strongly positive in absence of high voltage load, cutting off Q4 and effectively removing winding 40 from the system during trace time. As the ultor circuit load increases, the signal on line 17*a* becomes more negative, gradually increasing the conductivity through Q4 with corresponding increases in the energy stored magnetically in winding 40. That energy is available during retrace, tending to stabilize the high voltage in the manner already described for other embodiments. To permit current to flow from ground through winding 40** during the latter portion of retrace after reversal of the current, transistor Q4 may be of bilateral type. Alternatively, as indicated in FIG. 7, the transistor may be shunted by the diode D6 in reverse polarity. With that arrangement the transistor is effectively eliminated from the circuit at least during the latter portion of the retrace period so that it has relatively little effect upon the resonant frequency during the half-cycle of system oscillation. Hence in the present system the high voltage regulation is exercised primarily through variation of the amount of energy stored magnetically during trace time.

I claim:

1. In combination with a television line deflection and high voltage system which comprises a picture tube having means for producing in the tube an electron beam of intensity variable within a normal intensity range and electromagnetic yoke means energizable to produce line deflection of the electron beam, switching means responsive to input periodic line synchronizing signals, means controlled by the switching means for supplying energizing voltage to the yoke means to produce line trace movements of the electron beam and for cutting off such voltage supply to produce retrace movements of the electron beam and to produce high voltage flyback pulses, and means for rectifying the flyback pulses to produce high voltage power for supply to the picture tube for electron beam acceleration;

circuit means including inductance means connected in series with said switching means and effectively in parallel with the yoke means, and means for controllingly varying the effective impedance of said circuit means in inverse relation to the intensity of said electron beam.

2. The combination defined in claim 1, said combination including a saturable core transformer having primary winding means connected in series with said switching means and effectively in parallel with said yoke means, secondary winding means connected in series with said rectifying means, and saturable core means inductively coupled with both said winding means, said core means becoming saturated in direct relation to the intensity of said electron beam within the normal intensity range thereof, said circuit means comprising said primary winding means of the transformer, and said impedance varying means comprising said saturable core means of the transformer.

3. The combination defined in claim 1, and wherein said circuit means comprise saturable reactor means connected in series with said switching means and effectively in parallel with the yoke means, and said impedance varying means comprise means for variably saturating the saturable reactor means in direct relation to the intensity of said electron beam.

4. The combination defined in claim 1, and wherein said circuit means comprise inductance means and variable resistive means series connected in series with said switching means and effectively in parallel with the yoke means, and said impedance varying means comprise means for varying the resistance of said resistive means in inverse relation to the intensity of said electron beam.

5. The combination defined in claim 1, and wherein said circuit means comprise a saturable reactor having active winding means connected in series with said switching means and effectively in parallel with the yoke means, control winding means, and magnetizable core means inductively coupled with both the active winding means and the control winding means, and said impedance varying means comprise sensing means for developing a control signal that varies in accordance with variations of the electron beam intensity, and means for supplying to the control winding means a control current that varies under control of said signal and that variably saturates the core means in response to variations of the electron beam intensity within said normal intensity range.

6. The combination defined in claim 5, and wherein said sensing means comprise resistive means connected in series with said rectifying means for the high voltage pulses and circuit means for developing a control signal proportional to the average voltage developed across said resistive means.

7. The combination defined in claim 1, and wherein said circuit means comprise a saturable reactor having active winding means connected in series with said switching means and effectively in parallel with the yoke means, control winding means, and magnetizable core means inductively coupled with both the active winding means and the control winding means, and said impedance varying means comprise means responsive to variations of the electron beam intensity for supplying to the control winding means a control current that varies in direct, non-linear relation to the electron beam intensity, said non-linear relation being such that the resulting saturation of the core means causes the effective inductance of the active winding means to increase substantially in direct proportion to the electron beam intensity.

8. In a television line deflection and high voltage supply system comprising a picture tube having means for producing in the tube an electron beam of variable intensity within a normal intensity range and yoke means energizable to produce line deflection of the electron beam, switching means responsive to input periodic line synchronizing signals, circuit means controlled by the switching means for supplying energizing voltage to the yoke means to produce line trace movement of the electron beam and for cutting off such voltage supply to produce retrace movements of the electron beam and to produce high voltage flyback pulses, transformer means having primary and secondary winding means and core means inductively coupled with both said winding means, means for supplying said flyback pulses to the primary winding means, and means for rectifying the pulses produced by the secondary winding means to supply high voltage power for supply to the picture tube for electron beam acceleration;

the improvement wherein said transformer means comprise a saturable core transformer, variable saturation of the transformer core tending to stabilize the voltage of said high voltage power supplied to the picture tube.

9. In combination with a television line deflection and high voltage system which comprises a picture tube having means for producing in the tube an electron beam of intensity variable within a normal intensity range and electromagnetic yoke means energizable to produce line deflection of the electron beam, switching means responsive to input periodic line synchronizing signals, circuit means controlled by the switching means for supplying energizing voltage to the yoke means to produce line trace movements of the electron beam with energy storage in the magnetic flux of the yoke means and for cutting off such voltage supply to produce line retrace movements of the electron beam with oscillation in said circuit means at a resonant frequency in response to said stored energy, and means for deriving from said oscillation high voltage power for supply to the picture tube for electron beam acceleration;

variable impedance means connected to said circuit means for varying the resonant frequency of said oscillation, and means responsive to variations in the intensity of said electron beam for controllably varying said impedance means to cause said resonant frequency to increase in response to increasing beam intensity.

10. In combination with a television line deflection and high voltage system which comprises a picture tube having means for producing in the tube an electron beam of intensity variable within a normal intensity range and electromagnetic yoke means energizable to produce line deflection of the electron beam, switching means responsive to input periodic line synchronizing signals, circuit means controlled by the switching means for supplying energizing voltage to the yoke means to produce line trace movements of the electron beam with energy storage in the magnetic flux of the yoke means and for cutting off such voltage supply to produce line retrace movements of the electron beam with oscillation in said circuit means at a resonant frequency in response to said stored energy, and means for deriving from said oscillation high voltage power for supply to the picture tube for electron beam acceleration;

inductance means connected effectively in parallel to said yoke means for energy storage during said line trace movements of the electron beam, and means for varying the magnitude of the energy stored by said inductance means in direct relation to the intensity of the electron beam.

11. In a television line deflection and high voltage supply system comprising a picture tube having means for producing in the tube an electron beam of variable intensity within a normal intensity range and yoke means energizable to produce line deflection of the electron beam, switching means responsive to input periodic line synchronizing signals, circuit means controlled by the switching means for supplying energizing voltage to the yoke means to produce line trace movements of the electron beam and for cutting off such voltage supply to produce retrace movements of the electron beam and to produce high voltage flyback pulses, transformer means having primary and secondary winding means and core means inductively coupled with both said winding means, means for supplying said flyback pulses to the primary winding means, and means for rectifying the pulses produced by the secondary winding means to supply high voltage power for supply to the picture tube for electron beam acceleration, the improvement wherein said transformer core means is saturable and is progressively saturated with increasing direct current component of the transformer primary current in response to increasing electron beam intensity within said normal intensity range, said variable saturation tending to stabilize the voltage of said high voltage power supplied to the picture tube.

References Cited

UNITED STATES PATENTS

| | | | |
|---|---|---|---|
| 3,320,470 | 5/1967 | Janssen | 315—27 |
| 3,329,859 | 7/1967 | Lemke | 315—27 X |
| 3,329,862 | 7/1967 | Lemke | 315—27 |
| 3,350,599 | 10/1967 | Rickling | 315—27 X |

RODNEY D. BENNETT, *Primary Examiner.*

C. L. WHITHAM, *Assistant Examiner.*